US012006898B2

(12) United States Patent
Williams

(10) Patent No.: US 12,006,898 B2
(45) Date of Patent: Jun. 11, 2024

(54) AIRCHARGER AIR INTAKE SYSTEM AND METHOD

(71) Applicant: K&N Engineering, Inc., Riverside, CA (US)

(72) Inventor: Steve Williams, Cherry Valley, CA (US)

(73) Assignee: K&N Engineering, Inc., Riverside, CA (US)

( * ) Notice: Subject to any disclaimer, the term of this patent is extended or adjusted under 35 U.S.C. 154(b) by 0 days.

(21) Appl. No.: 18/227,153

(22) Filed: Jul. 27, 2023

(65) Prior Publication Data

US 2023/0366367 A1 Nov. 16, 2023

Related U.S. Application Data

(63) Continuation of application No. 17/827,517, filed on May 27, 2022, now Pat. No. 11,808,241, which is a continuation of application No. 16/405,747, filed on May 7, 2019, now Pat. No. 10,808,653, which is a continuation of application No. 15/794,909, filed on Oct. 26, 2017, now Pat. No. 10,316,805, which is a continuation of application No. 15/453,496, filed on Mar. 8, 2017, now Pat. No. 10,378,491.

(60) Provisional application No. 62/305,391, filed on Mar. 8, 2016.

(51) Int. Cl.

*F02M 35/024* (2006.01)
*F02M 35/04* (2006.01)
*F02M 35/10* (2006.01)

(52) U.S. Cl.

CPC ................. *F02M 35/02433* (2013.01); *F02M 35/02483* (2013.01); *F02M 35/048* (2013.01); *F02M 35/10144* (2013.01); *F02M 35/10386* (2013.01)

(58) Field of Classification Search

CPC ....... F02M 35/02433; F02M 35/02483; F02M 35/048; F02M 35/10144; F02M 35/10386
See application file for complete search history.

(56) References Cited

U.S. PATENT DOCUMENTS 6,374,815 B1 * 4/2002 Ness ...................... F02M 25/06 123/198 E

* cited by examiner

*Primary Examiner* — Jacob M Amick
*Assistant Examiner* — Charles J Brauch
(74) *Attorney, Agent, or Firm* — Rutan & Tucker LLP; Hani Z. Sayed

(57) ABSTRACT

An apparatus and a method are provided for an aircharger air intake system for filtering and conducting an airstream to an air intake of an engine. The aircharger air intake system includes an air filter comprising a filter medium configured to entrap particulates flowing within the airstream. An air box comprising one or more sidewalls and a mount wall is configured to support the air filter within an engine bay. The air box is configured to be mounted, or fastened, onto the engine. An intake tube is coupled with the air filter and configured to conduct the airstream to the air intake of the engine. The intake tube is configured to be coupled with an air temperature sensor or a mass air sensor of the engine. An adapter is configured to couple the intake tube with the air intake.

20 Claims, 7 Drawing Sheets

FIG. 4
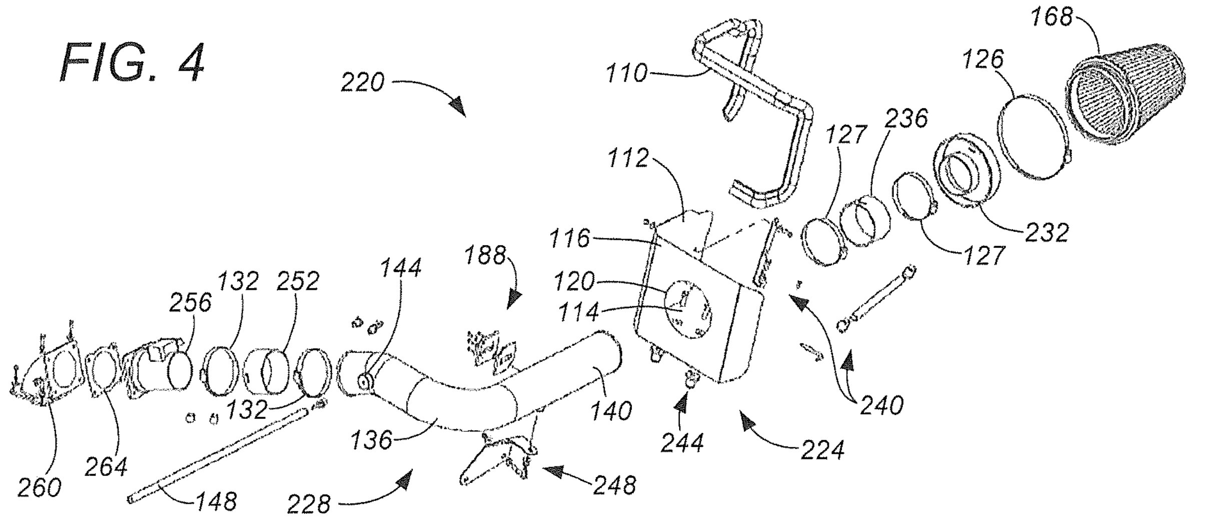
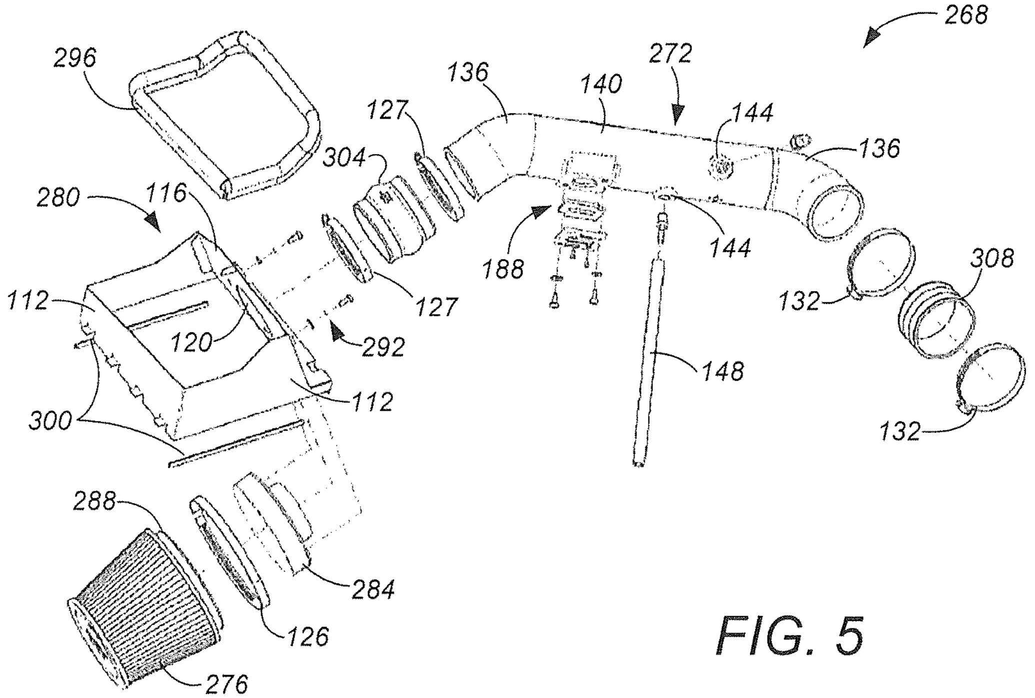
FIG. 5

FIG. 8
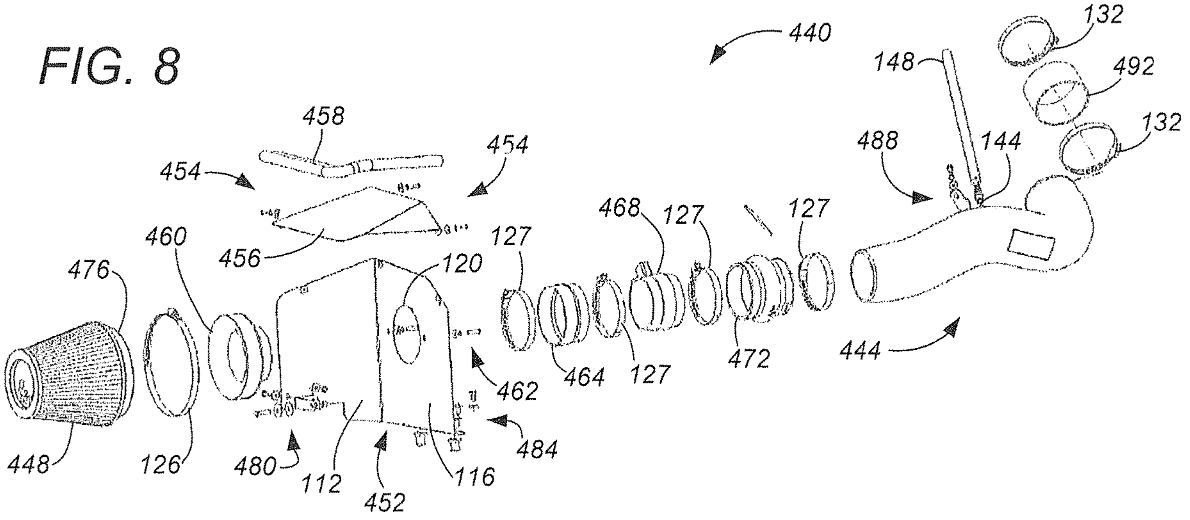
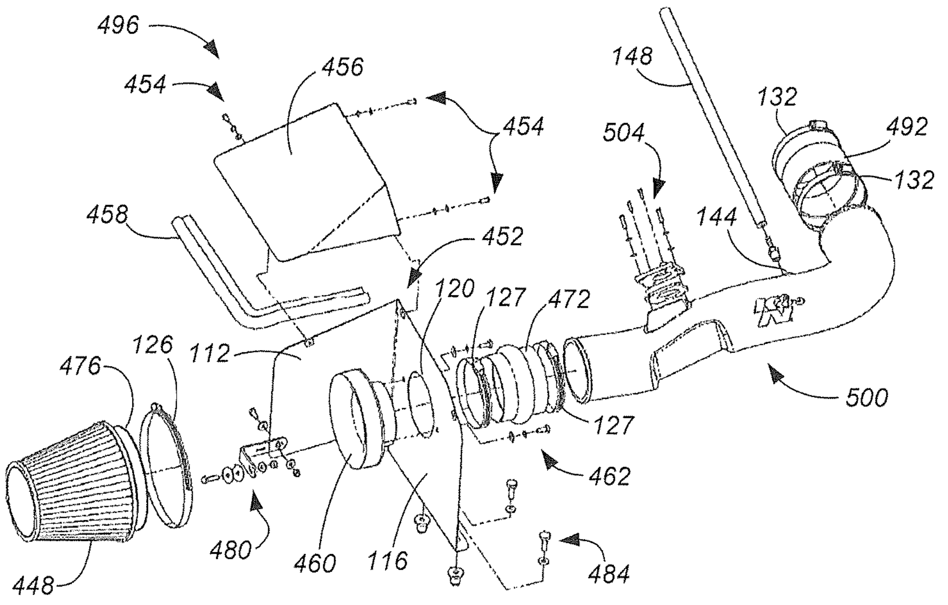
FIG. 9

AIRCHARGER AIR INTAKE SYSTEM AND METHOD

PRIORITY

This application is a continuation of, and claims the benefit of, U.S. patent application filed on May 27, 2022, having application Ser. No. 17/827,517 and U.S. patent application filed on May 7, 2019 and having application Ser. No. 16/405,747, issued U.S. Pat. No. 10,808,653 and U.S. patent application filed on Oct. 26, 2017, and having application Ser. No. 15/794,909, issued U.S. Pat. No. 10,316,805 and U.S. patent application, entitled "Aircharger Air Intake System And Method," filed on Mar. 8, 2017, and having application Ser. No. 15/453,496, issued U.S. Pat. No. 10,378,491 which claims the benefit of, and priority to, U.S. Provisional Application, entitled "Aircharger Air Intake System And Method," filed on Mar. 8, 2016 and having application Ser. No. 62/305,391, the entirety of each of said applications being incorporated herein by reference.

FIELD

The field of the present disclosure generally relates to air filters. More particularly, the field of the invention relates to an apparatus and a method for an aircharger air intake system for conducing filtered air to an air intake of an engine.

BACKGROUND

An air filter designed to remove particulate is generally a device composed of fibrous materials. These fibrous materials may remove solid particulates such as dust, pollen, mold, and bacteria from the air. Air filters are used in applications where air quality is important, notably in building ventilation systems and in engines.

Air filters may be used in automobiles, trucks, tractors, locomotives and other vehicles that use internal combustion engines. Air filters may be used with gasoline engines, diesel engines, or other engines that run on fossil fuels or other combustible substances. Air filters may be used with engines in which combustion is intermittent, such as four-stroke and two-stroke piston engines, as well as other types of engines that take in air so that a combustible substance may be burned. For example, air filters may be used with some gas turbines. Filters may also be used with air compressors or in other devices that take in air.

Filters may be made from pleated paper, foam, cotton, spun fiberglass, or other known filter materials. Generally the air intakes of internal combustion engines and compressors tend to use either: paper, foam, or cotton filters. Some filters use an oil bath. Air filters for internal combustion engines prevents abrasive particulate matter from entering the engine's cylinders, where it would cause mechanical wear and oil contamination. Many fuel injected engines utilize a flat panel pleated paper filter element. This filter is usually placed inside an enclosed, plastic box connected to a throttle body by way of ductwork. Vehicles that use carburetors or throttle body fuel injection systems typically use a cylindrical air filter positioned above the carburetor or the throttle body.

A drawback to enclosed air boxes that require flat panel paper filters is that as particulate matter builds up in the filter, air flow through the filter becomes restricted. Such a restricted air flow generally leads to a reduction in engine performance, such as a decrease in engine power output and a greater fuel consumption. Moreover, as the paper filter becomes increasingly clogged, pressure inside the filter decreases while the atmospheric air pressure outside the filter remains the same. When the difference in pressure becomes too great, contaminants may be drawn through the paper filter directly into the engine. Thus, the ability of the paper filter to protect the engine from contamination and internal damage tends to decrease near the end of the filter's service life. Typically, paper air filters are removed from the vehicle and discarded, and a new paper air filter is then installed. Considering that there are millions of vehicles throughout the world, the volume of discarded air filters that could be eliminated from landfills is a staggering number. Another drawback to enclosed air boxes is that they typically conduct air through a tortuous path of hoses or ductwork before the air enters the intake of the engine. In some cases, the air box is a greater source of air restriction than is the paper filter. Similar to a contaminated air filter, a restrictive air box decreases engine performance and fuel economy. What is needed, therefore, is an air intake system which exhibits reduced air resistance and includes an air filter which may be periodically cleaned and reused.

SUMMARY

An apparatus and a method are provided for an aircharger air intake system for conducting and filtering an airstream to an air intake of an engine. The aircharger air intake system includes an air filter comprising a filter medium configured to entrap particulates flowing within the airstream. An air box comprising one or more sidewalls and a mount wall is configured to support the air filter within an engine bay. The one or more sidewalls are configured to receive fasteners suitable for installing the air box onto the engine. An intake tube is coupled with the air filter and configured to conduct the airstream to the air intake. An opening in the mount wall receives an adapter that is configured to couple the air filter and the intake tube to the mount wall. The intake tube is configured to be coupled with an air temperature sensor or a mass air sensor of the engine. In one embodiment, the intake tube comprises one or more flanges configured to receive at least a crankcase ventilation hose extending from the engine. An adapter assembly is configured to couple the intake tube with the air intake. In one embodiment, an adapter is configured to secure the intake tube to a throttle body of the engine.

In an exemplary embodiment, an aircharger air intake system for filtering and conducting an airstream to an air intake of an engine comprises an air filter comprising a filter medium configured to entrap particulates flowing within the airstream; an air box comprising one or more sidewalls and a mount wall; an intake tube coupled with the air filter and configured to conduct the airstream to the air intake; and an adapter configured to couple the intake tube with the air intake.

In another exemplary embodiment, one or more pliable strips are configured to be extended along one or more edges of the sidewalls and the mount wall. In another exemplary embodiment, the air box is configured to be mounted onto the engine, the one or more sidewalls being configured to receive fasteners suitable for installing the air box onto the engine. In another exemplary embodiment, the air box further comprises a floor configured to protect the air filter from road debris and isolate the air filter from other components within an engine bay. In another exemplary embodiment, the air box comprises a heatshield configured to be coupled with at least the mount wall by way of suitable fasteners. In another exemplary embodiment, the mount wall comprises an opening that receives an adapter configured to couple the air filter and the intake tube to the mount wall.

In another exemplary embodiment, a mass air sensor of the engine is disposed between the air filter and the intake tube, a first adapter being coupled between the air filter and the mass air sensor, and a second adapter being secured between the mass air sensor and the intake tube. In another exemplary embodiment, the intake tube comprises a shape and size suitable for conducting the airstream from the air filter into the air intake. In another exemplary embodiment, the intake tube is comprised of an arrangement of one or more bends and one or more straight portions to communicate the airstream from the air filter to the air intake.

In another exemplary embodiment, the intake tube comprises one or more flanges configured to receive at least a crankcase ventilation hose extending from the engine. In another exemplary embodiment, the intake tube comprises one or more grommets removably disposed within openings that are configured to receive at least an air temperature sensor and a mass air sensor that are coupled with the engine. In another exemplary embodiment, an adapter assembly is configured to couple the intake tube and a mass air sensor assembly of the engine. In another exemplary embodiment, an adapter is configured to secure the intake tube to a throttle body of the engine.

In an exemplary embodiment, a method for an aircharger air intake system for filtering and conducting an airstream to an air intake of an engine comprises configuring an air box to support an air filter and be coupled with the engine; coupling an intake tube between the air filter and the air intake of the engine; and adapting the intake tube to conduct the airstream to the air intake of the engine.

In another exemplary embodiment, configuring comprises coupling a heatshield with at least a mount wall comprising the air box. In another exemplary embodiment, configuring comprises forming an opening in a mount wall of the air box to support the air filter and the intake tube. In another exemplary embodiment, coupling comprises forming an arrangement of one or more bends and one or more straight portions comprising the intake tube to communicate the airstream from the air filter to the air intake of the engine. In another exemplary embodiment, adapting comprises fabricating an adapter to secure the intake tube to a throttle body of the engine. In another exemplary embodiment, adapting further comprises configuring an adapter assembly to couple a mass air sensor of the engine to the intake tube.

In an exemplary embodiment, an aircharger air intake system for filtering and conducting an airstream to an air intake of an engine comprises an air filter configured to entrap particulates flowing within the airstream; an intake tube coupled with the air filter and configured to conduct the airstream to the air intake; and a breather plate configured to couple the intake tube and the air intake. In another exemplary embodiment, the breather plate is comprised of a velocity stack portion that is configured to direct the airstream from the intake tube into the air intake of the engine.

In another exemplary embodiment, the breather plate further comprises one or more mount portions configured to receive bolts so as to facilitate fastening the breather plate to the engine. In another exemplary embodiment, O-Rings are disposed above and below the mount portions to provide cushioning between the breather plate, the bolts, and the engine. In another exemplary embodiment, the breather plate is coupled to the air intake by way of a plurality of suitable fasteners extending through countersunk holes disposed in the breather plate and engaged with threaded holes in the air intake, a gasket being disposed between the breather plate and the air intake and configured to establish an airtight seal therebetween. In another exemplary embodiment, the intake tube is coupled to the breather plate by way of a plurality of threaded studs that are engaged within threaded holes in the breather plate, such that remaining portions of the threaded studs extend from the breather plate, each of the remaining portions extending through a hole disposed in the intake tube and receiving an acorn nut that is tightened to fasten the intake tube to the breather plate, a gasket being disposed between the intake tube and the breather plate and configured to establish an airtight seal therebetween.

In an exemplary embodiment, an aircharger air intake system for filtering and conducting an airstream to an air intake of an engine comprises an air filter retained between an air scoop and an air scoop base and configured to entrap particulates flowing within the airstream; a velocity stack portion comprising the air scoop base; and a breather plate configured to couple the air scoop base and the air intake. In another exemplary embodiment, the air filter comprises a pliable strip configured to be pressed against an interior surface of the air scoop upon fastening of the air scoop onto the air scoop base, such that the airstream entering the air scoop passes through the air filter before entering into the air intake of the engine. In another exemplary embodiment, the air scoop is fastened to the air scoop base by way of a plurality of fasteners inserted through holes in the air scoop and fixedly engaged with threaded holes in the air scoop base.

In another exemplary embodiment, the air scoop includes a forward opening and one or more rearward openings, the forward opening being configured to capture an oncoming airstream due to vehicle motion, and the one or more rearward openings being configured to allow air to enter the air scoop in absence of the oncoming airstream, a mesh insert being fastened inside the air scoop and covering the one or more rearward openings to increase aesthetic appeal of the air scoop. In another exemplary embodiment, the velocity stack portion is configured to direct the airstream from an interior of the air filter through an air opening of the breather plate and into the air intake of the engine.

In another exemplary embodiment, the breather plate further comprises one or more mount portions configured to receive bolts so as to facilitate fastening the breather plate to the engine, and wherein O-Rings are disposed above and below the mount portions to provide cushioning between the breather plate, the bolts, and the engine. In another exemplary embodiment, a plurality of fasteners are inserted through holes in the air scoop base and fixedly engaged within threaded holes disposed in the breather plate so as to fasten the air scoop base to the breather plate, a gasket being disposed between the air scoop base and the breather plate establishing an airtight seal therebetween. In another exemplary embodiment, the breather plate is coupled to the air intake by way of a plurality of suitable fasteners extending through countersunk holes disposed in the breather plate and engaged with threaded holes in the air intake of the engine, a gasket being disposed between the breather plate and the air intake establishing an airtight seal therebetween.

In an exemplary embodiment, an aircharger air intake system for filtering and conducting an airstream to an air intake of an engine comprises an air filter configured to entrap particulates flowing within the airstream; a filter back plate configured to couple the air filter and the air intake; a velocity stack configured to be disposed on the filter back plate; and a filter lid configured to be fastened onto a cap of the air filter. In another exemplary embodiment, the filter back plate and the filter lid are comprised of a rigid material capable of withstanding the temperature and air pressure associated with operation of the engine. In another exemplary embodiment, the filter back plate comprises an air opening that receives the velocity stack, such that an airtight seal is established between the filter back plate and the air intake of the engine, the velocity stack being configured to direct the airstream from an interior of the air filter into the air intake.

In another exemplary embodiment, a plurality of fasteners are inserted through the velocity stack, through intake mount holes disposed in the filter back plate, and engaged with threaded holes of the air intake of the engine, such that tightening the plurality of fasteners fixates the filter back plate to the intake of engine and causes the velocity stack to establish an airtight seal between the filter back plate and the air intake. In another exemplary embodiment, the filter back plate further comprises one or more mount portions configured to receive bolts so as to facilitate fastening the filter back plate to the engine, and wherein O-Rings are disposed above and below the mount portions to prevent unfiltered air from bypassing the air filter and to provide cushioning between the filter back plate, the bolts, and the engine. In another exemplary embodiment, a plurality of threaded standoffs are disposed between an interior of the air filter and the filter back plate, a plurality of fasteners being inserted through holes in the cap and fixedly engaged with the threaded standoffs, and a plurality of fasteners being inserted through holes in the filter back plate and fixedly engaged with the threaded standoffs, such that the air filter is pressed against the filter back plate whereby the airstream entering the velocity stack first passes through the air filter.

BRIEF DESCRIPTION OF THE DRAWINGS

The drawings refer to embodiments of the present disclosure in which:

FIG. 4 illustrates an exploded perspective view of an exemplary embodiment of an aircharger air intake system that is similar to the aircharger systems illustrated in FIGS. 2-3;

FIG. 5 illustrates an exploded perspective view of an exemplary embodiment of an aircharger air intake system comprising an intake tube that couples an air filter with an air intake of the engine;

FIG. 8 illustrates an exploded perspective view of an exemplary embodiment of an aircharger air intake system comprising an intake tube that couples an air filter to an air intake of an engine;

FIG. 9 illustrates an exploded perspective view of an exemplary embodiment of an aircharger air intake system in accordance with the present disclosure;

Figure 1:
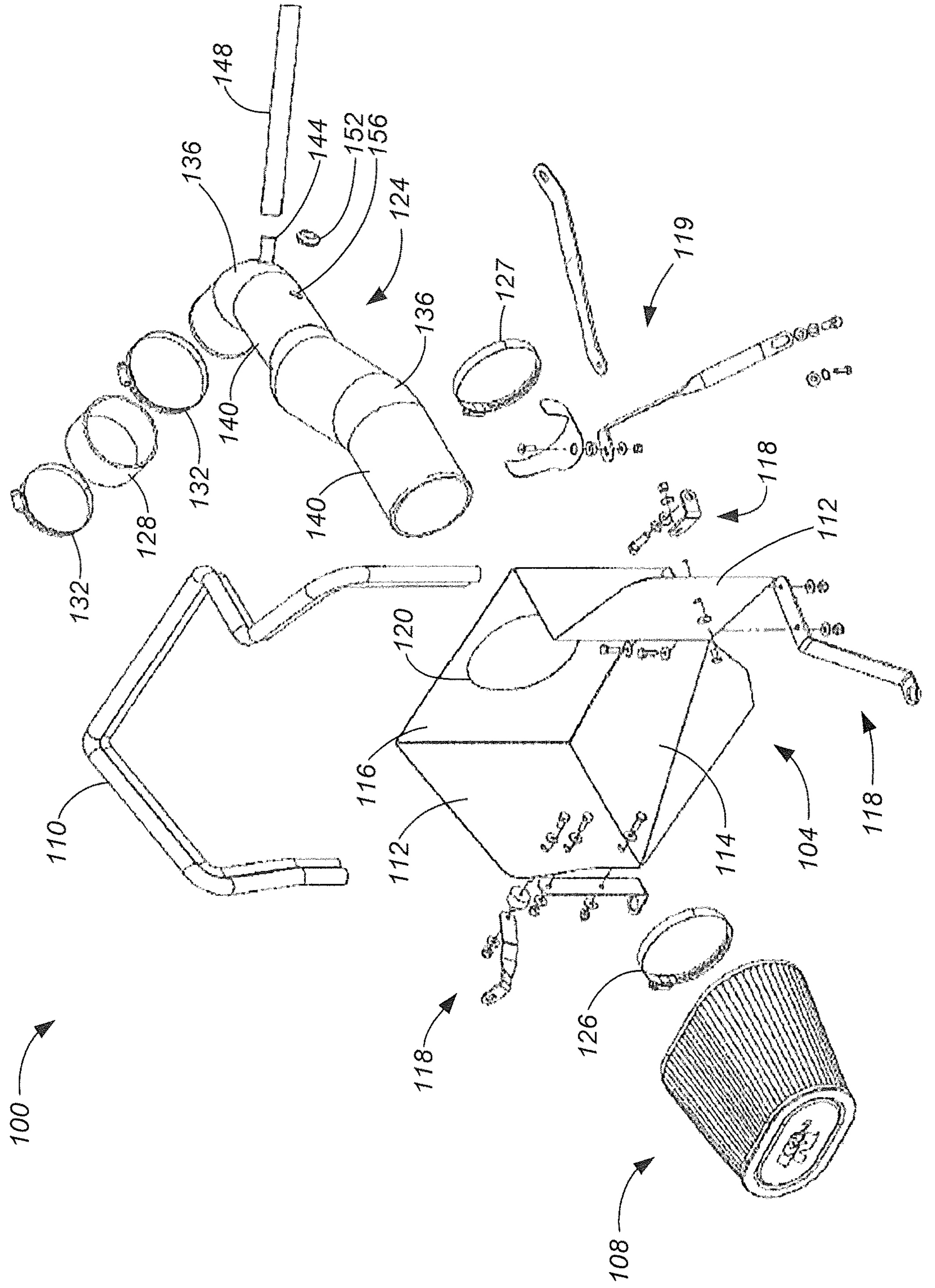
FIG. 1 illustrates an exploded perspective view of an exemplary embodiment of an aircharger air intake system comprising an air box configured to couple an oval-shaped air filter to an air intake system of an engine.

While the present disclosure is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the present disclosure.

DETAILED DESCRIPTION

In the following description, numerous specific details are set forth in order to provide a thorough understanding of the present disclosure. It will be apparent, however, to one of ordinary skill in the art that the invention disclosed herein may be practiced without these specific details. In other instances, specific numeric references such as “first hose,” may be made. However, the specific numeric reference should not be interpreted as a literal sequential order but rather interpreted that the “first hose” is different than a “second hose.” Thus, the specific details set forth are merely exemplary. The specific details may be varied from and still be contemplated to be within the spirit and scope of the present disclosure. The term “coupled” is defined as meaning connected either directly to the component or indirectly to the component through another component. Further, as used herein, the terms “about,” “approximately,” or “substantially” for any numerical values or ranges indicate a suitable dimensional tolerance that allows the part or collection of components to function for its intended purpose as described herein.

In general, the present disclosure describes an apparatus and a method for an aircharger air intake system configured to conduct filtered air to an air intake of an engine. The aircharger air intake system includes an air filter comprising a filter medium configured to pass an airstream and entrap particulates flowing within the airstream. An air box comprising one or more sidewalls and a mount wall is configured to support the air filter within an engine bay. The air box is configured to be mounted, or fastened, to an interior of the engine bay. An intake tube is coupled with the air filter and configured to conduct the airstream to the air intake. The intake tube generally comprises an arrangement of one or more bends and one or more straight portions configured to communicate the airstream from the air filter to the air intake of the engine. In some embodiments, the intake tube may be configured to be coupled with an air temperature sensor or a mass air sensor of the engine. An adapter is configured to couple the intake tube with the air intake of the engine.

Although embodiments of the present disclosure may be described and illustrated herein in terms of a cylindrical air filter, it should be understood that embodiments of the present disclosure are not limited to the exact shape illustrated, but rather may include a wide variety of generally cylindrical shapes, generally circular, oval, round, curved, conical, or other closed perimeter shape, that provide a relatively large surface area in a given volume of the filter. Moreover, embodiments as described herein are not limited to use as internal combustion engine filters, but may have applicability in other filtration systems in which a large volume of air needs to be treated.

FIG. 1 illustrates an exploded perspective view of an exemplary embodiment of an aircharger air intake system 100 comprising an air box 104 configured to couple an oval-shaped air filter 108 to an air intake of an engine. The air box 104 comprises sidewalls 112, a floor 114, and a mount wall 116. Preferably, the air box 104 is comprised of a rigid material that is sufficiently durable and temperature resistant to retain its configuration during installation and operation when coupled with the air intake of the engine. A pliable strip 110 is configured to be received along at least the top edges of the sidewalls 112 and the mount wall 116 so as to hide any sharp edges thereon.

The air filter 108 comprises a filter medium that provides an area to pass an airstream and entrap particulates and other contaminates flowing with the airstream. The filter medium may be comprised of paper, foam, cotton, spun fiberglass, or other known filter materials, woven or non-woven material, synthetic or natural, or any combination thereof. The filter medium may be pleated, or otherwise shaped, or contoured so as to increase a surface area for passing the airstream to be cleaned. The length of the filter medium in the circumferential direction may be longer than the circular circumference of the air filter 108 generally, such that the surface area of the filter medium is greater than the profile surface area of the air filter 108.

In some embodiments, the filter medium comprises 4 to 6 layers of cotton gauze sandwiched between two epoxy-coated aluminum wire screens. The cotton may be advantageously treated with a suitably formulated filter oil composition that causes tackiness throughout microscopic strands comprising the filter medium. The nature of the cotton allows high volumes of airflow, and when combined with the tackiness of the filter oil composition creates a powerful filtering medium which ensures a high degree of air filtration. Further details about components comprising the air filter 108, as well as details about the filter oil composition, are disclosed in U.S. patent application Ser. No. 14/181,678, entitled "Air Box With Integrated Filter Media," filed on Feb. 16, 2014, and U.S. patent application Ser. No. 14/701,163, entitled "Filter Oil Formulation," filed on Apr. 30, 2015, the entirety of each of which is incorporated herein by reference.

The air box 104 generally is of an open variety, rather than being an enclosed air box as is conventionally utilized with many vehicles. The sidewalls 112 and the floor 114 serve to protect the air filter 108 from road debris, as well as to isolate the air filter 108 from hoses and other components that may be present within an engine bay of the vehicle. It will be recognized by those skilled in the art that the open air box 104 improves airflow to the air filter 108, and thus decreases air resistance to the air intake of the engine, thereby improving engine performance beyond that otherwise possible with an enclosed air box. The air box 104 generally is configured to be mounted, or fastened, onto the engine. As shown in FIG. 1, the sidewalls 112 are configured to receive suitable fasteners 118 to facilitate installing the air box 104 onto the engine. As will be appreciated, the fasteners 118 generally may comprise any of suitably designed holes, brackets, molded shaped portions, protrusions, extensions, angled brackets, hardware fasteners, or other any similar device for supporting the air box within the engine bay. It should be understood that the particular fasteners will vary according to the specific make and model of the vehicle with which the air box is to be used.

The mount wall 116 generally is configured to support the air filter 108 and provide an interface between the air filter 108 and the air intake of the engine. An opening 120 in the mount wall 116 is configured to receive an intake tube 124 that is configured to couple the air filter 108 with the air intake of the engine. In the embodiment illustrated in FIG. 1, a suitably sized hose clamp 126 fastens the intake tube 124 within a flange of the air filter 108. A similar hose clamp 127 attaches the intake tube 124 to hardware fasteners 119. Similarly to the fasteners 118, the hardware fasteners 119 are configured to support the intake tube 124 within the engine bay. The hardware fasteners 119 generally may comprise any of suitably designed holes, brackets, molded shaped portions, protrusions, extensions, angled brackets, hardware fasteners, as well as any other device suitable for supporting the intake tube 124 within the engine bay.

In the embodiment illustrated in FIG. 1, the intake tube 124 is coupled to the air intake of the engine by way of an adapter 128. A pair of clamps 132 ensure an airtight seal is maintained between the intake tube 124 and the air intake. The intake tube 124 preferably comprises a shape and size suitable for conducting air drawn through the air filter 108 into the air intake of the engine. As such, the intake tube 124 generally comprises an arrangement of one or more bends 136 and one or more straight portions 140 so as to connect the air filter 108 to the air intake of the engine. Further, the intake tube 124 may comprise one or more flanges 144 to receive various ventilation hoses 148 extending from the engine, such as a crankcase ventilation hose. As will be appreciated, the number and configuration of the flanges 144, as well as the shapes and sizes of the bends 136 and straight portions 140 comprising the intake tube 124 generally depend upon the particular vehicle for which the aircharger air intake system 100 is to be utilized. It should be understood, therefore, that a wide variety of different configurations of the intake tube 124, including but not limited to the number and configuration of the flanges 144, may be incorporated into other embodiments of the aircharger system 100 without detracting from the present disclosure.

Moreover, in some embodiments, the intake tube 124 may comprise one or more grommets that are removable from openings within the wall of the intake tube and are configured to receive any of various hoses and sensors that may extend from the engine. In the embodiment of FIG. 1, the intake tube 124 comprises a grommet 152 and a corresponding opening 156 suitable for receiving an air temperature sensor extending from the engine. As will be appreciated, in those embodiments wherein the air temperature sensor is absent, the grommet 152 may be installed into the opening 156 of the intake tube 124 to prevent unwanted air entering into the intake of the engine.

Figure 2:
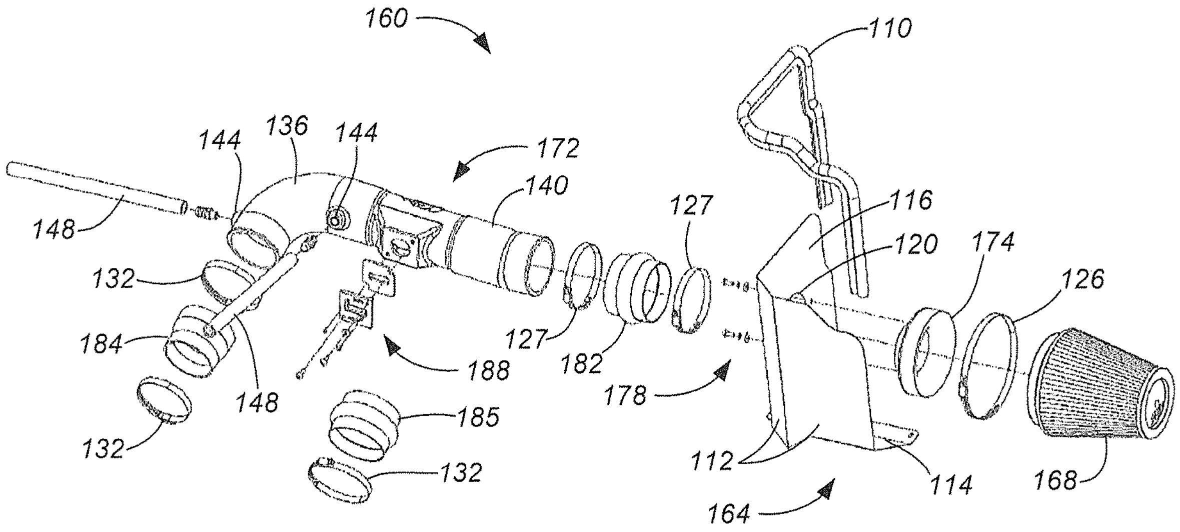
FIG. 2 illustrates an exploded perspective view of an exemplary embodiment of an aircharger system comprising an air box configured to couple a cone-shaped air filter to an air intake system of an engine.

As will be appreciated by those skilled in the art, the configuration of the adapter 128 and the clamps 132 depend upon the particular vehicle for which the aircharger system 100 is to be used. For example, FIG. 2 illustrates an exploded perspective view of an exemplary embodiment of an aircharger system 160 that is similar to the aircharger system 100 illustrated in FIG. 1. The aircharger system 160 generally comprises an air box 164 that supports a cone-shaped air filter 168 that is coupled to the air intake of the engine by way of an intake tube 172. As shown in FIG. 2, an adapter 174 and fasteners 178 couple the cone-shaped filter 168 with the mounting wall 116 of the air box 164. An adapter 182 is configured to couple the intake tube 172 with the adapter 174. The clamps 127 ensure an airtight seal is maintained between the intake tube 172 and the adapter 174. An adapter 184 is configured to couple the intake tube 172 to the air intake of the engine. Optionally, an adapter 185 may be used in lieu of the adapter 184 to install the aircharger system 160 into vehicles wherein the adapter 184 is incompatible with the air intake of the engine. As described above, the clamps 132 ensure an airtight seal is maintained between the intake tube 172 and the air intake of the engine.

As will be appreciated, the intake tube 172 is similar to the intake tube 124, with the exception that two of the flanges 144 are disposed on the intake tube 172 in locations different than on the intake tube 124. In the embodiment illustrated in FIG. 2, the two flanges 144 receive crankcase ventilation hoses of the engine. The intake tube 172 further comprises an adapter assembly 188 configured to couple a mass air sensor assembly of the engine with the intake tube 172.

Figure 3:
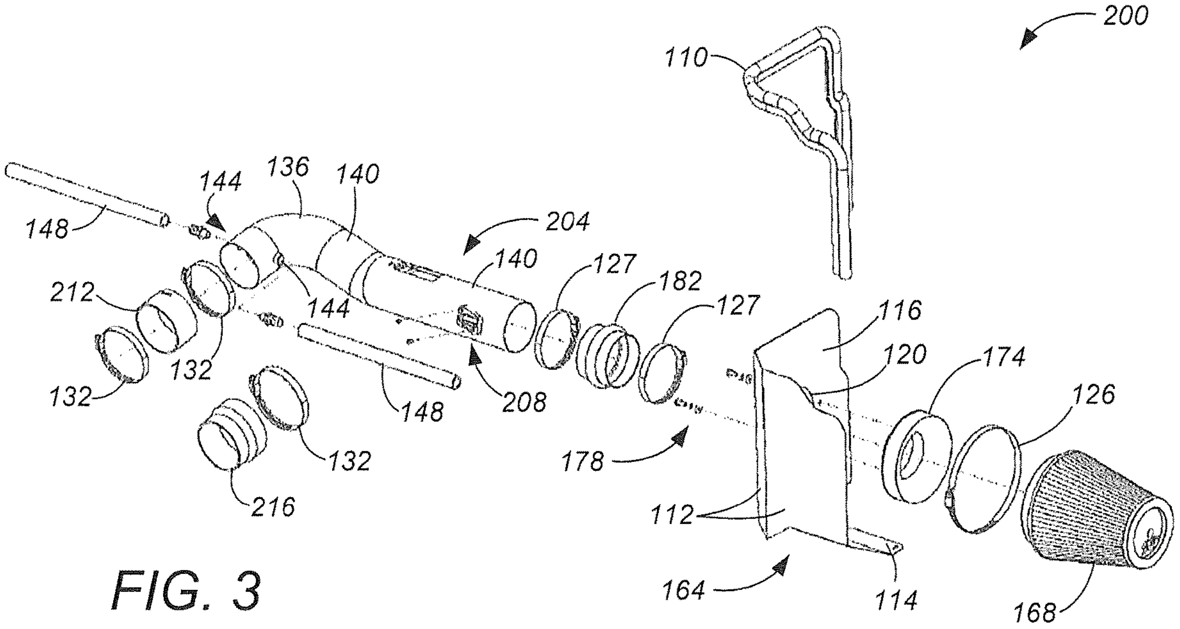
FIG. 3 illustrates an exploded perspective view of an exemplary embodiment of an aircharger air intake system which is similar to the aircharger system illustrated in FIG. 2.

FIG. 3 illustrates an exploded perspective view of an exemplary embodiment of an aircharger air intake system 200 which is substantially similar to the aircharger system 160 of FIG. 2. As shown in FIG. 3, the aircharger system 200 comprises an intake tube 204 that is substantially similar to the intake tube 172, with the exception that the intake tube 204 comprises a slightly different arrangement of the bends 136 and straight portions 140 than the intake tube 172. Similar to the intake tube 172, the intake tube 204 comprises an assembly 208 to couple a mass air sensor assembly of the engine with the intake tube 204. Further, the intake tube 204 is configured to be coupled with the air intake of the engine by way of an adapter 212. A pair of clamps 132 maintain an airtight seal between the intake tube 204, the adapter 212, and the air intake of the engine. An alternative adapter 216 facilitates installing the aircharger system 200 into vehicles in which the adapter 212 is incompatible.

FIG. 4 illustrates an exploded perspective view of an exemplary embodiment of an aircharger air intake system 220 that is similar to the aircharger systems illustrated in FIGS. 1-3. As shown in FIG. 4, the aircharger system 220 comprises an air box 224 that supports a cone-shaped air filter 168 that is coupled to the air intake of the engine by way of an intake tube 228. An adapter 232 is configured to fasten the air filter 168 to a mount wall 116 of the air box 224, as discussed above in connection with FIGS. 2-3. An adapter 236 and clamps 127 form an airtight seal between the intake tube 228, extending through the opening 120, and the adapter 232.

As discussed with respect to the air box 104, illustrated in FIG. 1, the air box 224 is configured to be mounted within the engine bay of the vehicle by way of a multiplicity of suitable fasteners. The sidewalls 112 are configured to receive fasteners 240, and the floor 114 receives fasteners 244, so as to support the air box 224 and the air filter 168 within the engine bay. Further, fasteners 248 are configured to support the intake tube 228 within the engine bay. As shown in FIG. 4, the fasteners 240, 244, and 248 generally may comprise any of suitably designed holes, brackets, molded shaped portions, protrusions, extensions, angled brackets, hardware fasteners, may include other any similar devices for mounting the air box 224 and the intake tube 228 onto the engine, without limitation.

It will be recognized that, similarly to intake tube 172, the intake tube 228 is comprised of an arrangement of one or more bends 136 and straight portions 140 suitable to communicate an airstream from the air filter 168 to the air intake of the engine. The intake tube 228 further comprises an adapter assembly 188 configured to couple a mass air sensor assembly of the engine with the intake tube, and includes a flange 144 configured to receive a crankcase ventilation hose 148 extending from the engine. An adapter 252 and a pair of clamps 132 are configured to secure the intake tube 228 to a throttle body 256 of the engine. As further illustrated in FIG. 4, the aircharger system 220 comprises a throttle adapter 260 configured to position the throttle body 256 at an angle suitable to receive the adapter 252 and the intake tube 228. A gasket 264 is configured to form an airtight seal between the throttle adapter 260 and the throttle body 256.

FIG. 5 illustrates an exploded perspective view of an exemplary embodiment of an aircharger air intake system 268 comprising an intake tube 272 that couples an air filter 276 with an air intake of an engine. The aircharger system 268 comprises an open, square-shaped air box 280 configured to support the air filter 276 within the engine bay. The air box 280 comprises sidewalls 112 and a mount wall 116 that includes an opening 120 suitable to receive an adapter 284. A flange 288 of the air filter 276 receives the adapter 284 and is secured thereto by way of a clamp 126, as discussed above. The air filter 276 and the adapter 284 are fastened to the mount wall 116 by way of suitable fasteners 292.

As with the air boxes discussed above, the air box 280 preferably is comprised of a rigid material that is sufficiently durable and temperature resistant to retain its configuration during installation and operation when coupled with the air intake of the engine. A pliable strip 296 is disposed along top edges of the sidewalls 112 and the mount wall 116 so as to hide any sharp edges thereon. Similarly, pliable strips 300 are disposed along bottom edges of the sidewalls to hide sharp edges. As will be recognized by those skilled in the art, the pliable strips 296 and 300 serve to reduce the incidence of injury during installation and maintenance of the aircharger system 268.

With the adapter 284 mounted to the mount wall 116, as described, an airtight seal is established between the adapter 284 and the intake tube 272 by way of an adapter 304 and suitably sized clamps 127. Similarly, the intake tube 272 is coupled to the air intake of the engine by way of an adapter 308 and clamps 132. As will be appreciated, the intake tube 272 comprises an arrangement of one or more bends 136 and straight portions 140 suitable to couple the air filter 276 with the air intake of the engine. Further, the intake tube 272 comprises an assembly 188, configured to receive a mass air sensor assembly of the engine, and a flange 144 to receive a crankcase ventilation hose 148.

Figure 6:
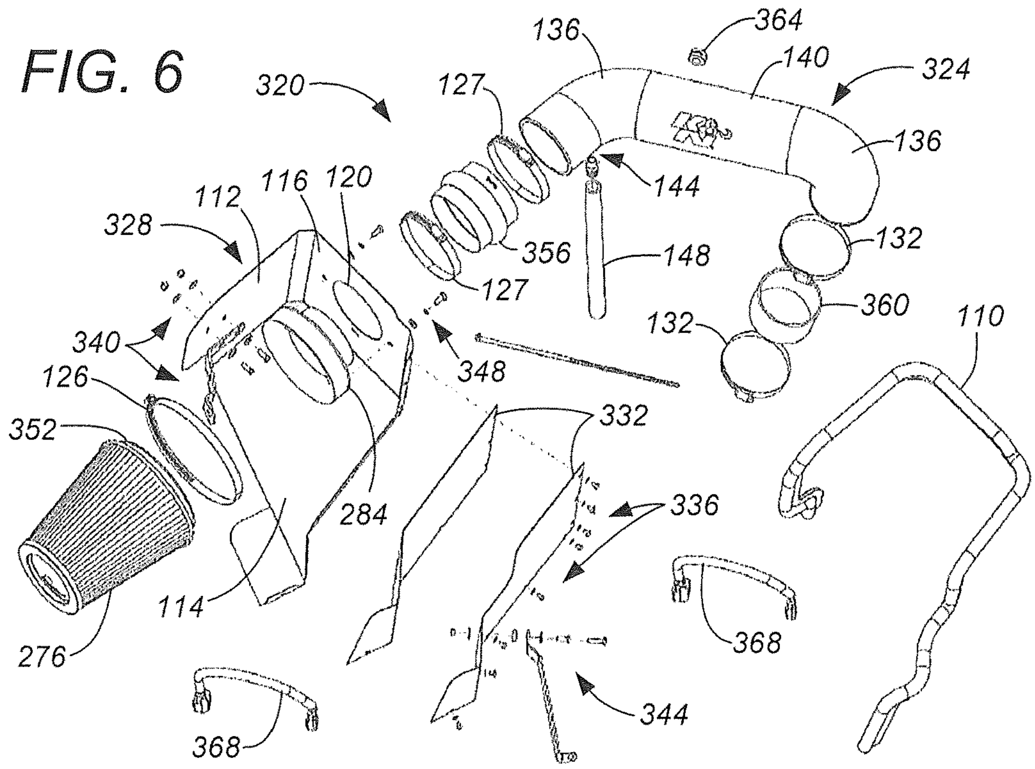
FIG. 6 illustrates an exploded perspective view of an exemplary embodiment of an aircharger air intake system comprising an intake tube that couples an air filter with an air intake of the engine.

FIG. 6 illustrates an exploded perspective view of an exemplary embodiment of an aircharger air intake system 320 comprising an intake tube 324 that couples an air filter 276 with an air intake of an engine. An air box 328 supports and houses the air filter 276. The air box 328 comprises a sidewall 112, a floor 114, and a mount wall 116. The air box 328 further comprises a pair of heatshields 332 that are configured to be fastened to the floor 114 and the mount wall 116 by way of suitable fasteners 336. Similar to the above-discussed air boxes, the air box 328 is comprised of a rigid material that is sufficiently durable and temperature resistant to retain its configuration during installation and operation when coupled with the air intake of the engine. A pliable strip 110 is configured to be received along the top edges of the sidewalls 112, the mount wall 116, and the heatshields 332 so as to hide any sharp edges thereon.

The air box 328 generally is configured to be mounted, or fastened, to the engine. As shown in FIG. 6, the sidewall 112 is configured to receive fasteners 340 and the heatshields 332 are configured to receive fasteners 344 so as to facilitate installing the air box onto the engine. As will be appreciated, the fasteners 340, 344 generally may comprise any of suitably designed holes, brackets, molded shaped portions, protrusions, extensions, angled brackets, hardware fasteners, or other any similar device for holding the air box fixed within the engine bay. As stated above, the particular fasteners will vary according to the specific make and model of the vehicle with which the air box is to be used.

The mount wall 116 generally is configured to support the air filter 276 and provide an interface between the air filter 276 and the intake of the engine. An opening 120 in the mount wall 116 is configured to receive an adapter 284 that may be fastened to the mount wall 116 by way of fasteners 348. A suitably sized clamp 126 may be used to secure the adapter 284 within a flange 352 of the air filter 276. Further, an adapter 356 may be used to couple the intake tube 324 with the adapter 284. A pair of clamps 127 may be used to ensure that the adapter 356 forms an airtight seal between the adapter 284 and the intake tube 324.

As shown in FIG. 6, the intake tube 324 may be coupled to the air intake of the engine by way of an adapter 360. A pair of clamps 132 ensure an airtight seal is established between the intake tube 324 and the air intake of the engine. Further, the intake tube 324 generally comprises a shape and size suitable for conducting air drawn through the air filter 276 into the air intake of the engine. As such, the intake tube 324 generally comprises one or more bends 136 and one or more straight portions 140 suitably arranged to connect the air filter 276 to the air intake of the engine. As will be appreciated, the shapes and sizes of the bends 136 and straight portions 140 generally depend upon the particular vehicle for which the aircharger air intake system 320 is to be utilized. It should be understood, therefore, that a wide variety of different configurations of the intake tube 324 may be incorporated into other embodiments of the aircharger system 320 without detracting from the present disclosure.

The intake tube 324 may comprise one or more flanges or other fittings configured to receive various ventilation hoses and sensors that may extend from the engine. In the illustrated embodiment of FIG. 6, the intake tube 324 comprises a flange 144 to receive a crankcase ventilation hose 148. Further, the intake tube 324 comprises a grommet 364 which may be removed from an opening (not shown) in the intake tube that is configured to receive an air temperature sensor (not shown) extending from the engine.

Moreover, the aircharger system 320 may optionally include one or more wiring harnesses 368 comprising suitably sized sockets and is configured to extend an existing wiring harness of the engine to the air temperature sensor installed into the intake tube 324. It will be recognized that the existing wiring harness may be plugged into a first socket of the wiring harness 368 and then a second socket of the wiring harness 368 may be plugged into the air temperature sensor. In those embodiments wherein the air temperature sensor is absent, the grommet 364 may be installed into the opening in the intake tube so as to prevent unwanted air entering into the air intake of the engine.

Figure 7:
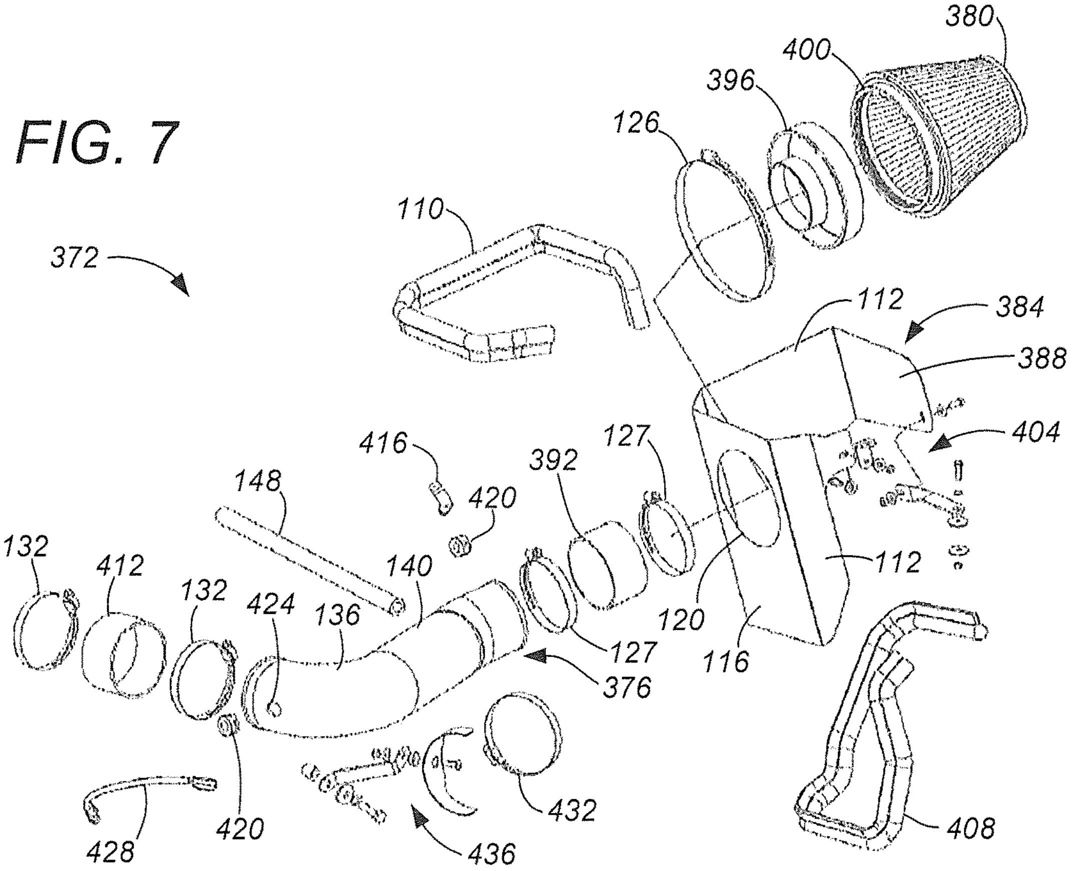
FIG. 7 illustrates an exploded perspective view of an exemplary embodiment of an aircharger air intake system comprising an intake tube that couples an air filter to an air intake of an engine.

FIG. 7 illustrates an exploded perspective view of an exemplary embodiment of an aircharger air intake system 372 comprising an intake tube 376 that couples an air filter 380 to an air intake of an engine. The air filter 380 is supported by an air box 384 comprising sidewalls 112, a mount wall 116, and a heatshield 388. An opening 120 in the mount wall 116 receives an adapter 392 that is secured to an adapter 396 by way of a first clamp 127. A second clamp 127 affixes the adapter 392 to the intake tube 376. Similarly, a clamp 126 secures the adapter 396 within a flange 400 of the air filter 380, such that the air filter is coupled with the intake tube 376 by way of the adapter 392 extending through the opening 120.

The air box 384 generally is configured to be mounted, or fastened, to the engine within an interior of an engine bay. In the embodiment shown in FIG. 7, the sidewalls 112 and the heatshield 388 are configured to receive fasteners 404 to enable mounting the air box to the engine. As will be appreciated, the fasteners 404 generally may comprise any of suitably designed holes, brackets, molded shaped portions, protrusions, extensions, angled brackets, hardware fasteners, or other any similar device for holding the air box fixed within the engine bay. The particular fasteners will vary according to the specific make and model of the vehicle with which the air box 384 is to be used. Further, a pair of pliable strips 110 and 408 are configured to be respectively received along top and bottom edges of the sidewalls 112, the mount wall 116, and the heatshield 388 so as to hide any sharp edges thereon. As will be recognized by those skilled in the art, the pliable strips 110 and 408 serve to reduce the incidence of injury during installation and maintenance of the aircharger system 372.

As shown in FIG. 7, the intake tube 376 is coupled to the air intake of the engine by way of an adapter 412. A pair of clamps 132 ensure an airtight seal is established between the intake tube 376, the adapter 412, and the air intake of the engine. Similarly to the above-discussed intake tubes, the intake tube 376 generally comprises a shape and size suitable for conducting air drawn through the air filter 380 into the air intake of the engine. To this end, the intake tube 376 comprises an arrangement of one or more bends 136 and one or more straight portions 140 that generally depends upon the specific vehicle for which the aircharger air intake system 372 is to be utilized. As such, a wide variety of different configurations of the intake tube 376 may be incorporated into other embodiments of the aircharger system 372 without detracting from the present disclosure.

Moreover, the intake tube 376 generally comprises one or more flanges or other fittings configured to receive various ventilation hoses or sensors extending from the engine. In the illustrated embodiment of FIG. 7, the intake tube 376 comprises an elbow 416 configured to be installed into the intake tube and receive a crankcase ventilation hose 148. Further, the intake tube 376 comprises a pair of grommets 420 that may be removed from corresponding openings 424 that are configured to receive an air temperature sensor (not shown) extending from the engine. As will be recognized, the pair of grommets 420 and corresponding openings 424 facilitate installing the air temperature sensor in different locations along the intake tube, as needed. Further, the aircharger system 372 includes an optional wiring harness 428 comprising suitably sized sockets and is configured to extend an existing wiring harness within the engine bay to the air temperature sensor installed into the intake tube 376. It is contemplated that the existing wiring harness may be plugged into a first socket of the optional wiring harness 428 and then a second socket of the optional wiring harness may be plugged into the air temperature sensor that is installed in one of the openings 424. In those embodiments wherein the air temperature sensor is not required, the grommets 420 may be installed into the openings 424 of the intake tube 376 to prevent unwanted air entering into the intake of the engine.

As shown in FIG. 7, a hose clamp 432 may be used to attach the intake tube 376 to hardware fasteners 436. As will be recognized, the hardware fasteners 436 are configured to support the intake tube 376 on the engine and maintain the coupling between the intake tube and the air intake of the engine. As with the above-discussed fasteners, the hardware fasteners 436 are contemplated to generally comprise any of suitably designed holes, brackets, molded shaped portions, protrusions, extensions, angled brackets, hardware fasteners, as well as any other device suitable for holding the intake tube 376 fixed to the engine.

FIG. 8 illustrates an exploded perspective view of an exemplary embodiment of an aircharger air intake system 440 comprising an intake tube 444 that couples an air filter 448 to an air intake of an engine. The air filter 448 is supported by an air box 452 comprising a sidewall 112, a mount wall 116, and a top heatshield 456. As shown in FIG. 8, the top heatshield 456 is configured to be mounted to the air box 452 by way of fasteners 454. A pliable strip 458 is configured to be received along the side edges of the top heatshield 456 so as to hide any sharp edges thereon, thus reducing the incidence of injury during installation and maintenance of the aircharger system 440.

An opening 120 in the mount wall 116 receives an adapter 460 that is secured to the mount wall by way of fasteners 462. The adapter 460 is further secured to an adapter 464 by way of a first clamp 127. A second clamp 127 affixes the adapter 464 to a mass air sensor 468 of the engine. A third clamp 127 secures the mass air sensor 468 to an adapter section 472, and a fourth clamp 127 secures the adapter section 472 to the intake tube 444. Similarly, a suitably sized clamp 126 secures the adapter 460 within a flange 476 of the air filter 448, such that the air filter is coupled with the intake tube 444.

As will be appreciated, the air box 452 is configured to be mounted to the engine, as discussed above. The sidewall 112 and the mount wall 116 are configured to respectively receive suitable fasteners 480 and 484 to mount the air box onto the engine. The fasteners 480 and 484 generally comprise any of suitably designed holes, brackets, molded shaped portions, protrusions, extensions, angled brackets, hardware fasteners, or other any similar device for holding the air box fixed within the engine bay. As will be recognized, the particular fasteners will vary according to the specific make and model of the vehicle with which the air box 452 is to be used.

In the embodiment illustrated in FIG. 8, the intake tube 444 comprises a conduit extending from the adapter 472 to an air intake of the engine. Unlike in previous embodiments, the intake tube 444 shown in FIG. 8 comprises a smoothly transitioning arrangement of curved portions that depend upon the particular vehicle for which the aircharger system 440 is intended to be used. As such, a wide variety of different arrangements of smoothly transitioning curved portions may be contemplated, without limitation, depending upon the vehicle into which the intake tube 444 is to be installed. The intake tube 444 may comprise one or more flanges or other fittings configured to receive various ventilation hoses or sensors extending from the engine. In the illustrated embodiment of FIG. 8, the intake tube 444 comprises a flange 144 configured to receive a crankcase ventilation hose 148.

As shown in FIG. 8, the intake tube 444 is configured to be coupled to the engine by way of hardware fasteners 488, whereby the intake tube is supported within the engine bay. As with the above-discussed fasteners, the hardware fasteners 488 are contemplated to generally comprise any of suitably designed holes, brackets, molded shaped portions, protrusions, extensions, angled brackets, hardware fasteners, as well as any other device suitable for mounting the intake tube 444 onto the engine. Further, the intake tube 444 is coupled to the air intake of the engine by way of an adapter 492. A pair of clamps 132 maintain an airtight seal between the intake tube 444, the adapter 492, and the air intake of the engine.

FIG. 9 illustrates an exploded perspective view of an exemplary embodiment of an aircharger air intake system 496 in accordance with the present disclosure. The aircharger system 496 is substantially similar to the aircharger system 440, illustrated in FIG. 8, with the exception that the aircharger system 496 comprises an intake tube 500. In the embodiment of FIG. 9, the intake tube 500 comprises an adapter assembly 504 that is configured to couple a mass air sensor assembly of the engine with the intake tube 500. As will be recognized, many vehicles rely on a mass air sensor assembly to maintain optimal engine performance during operation of the vehicle.

Figure 10:
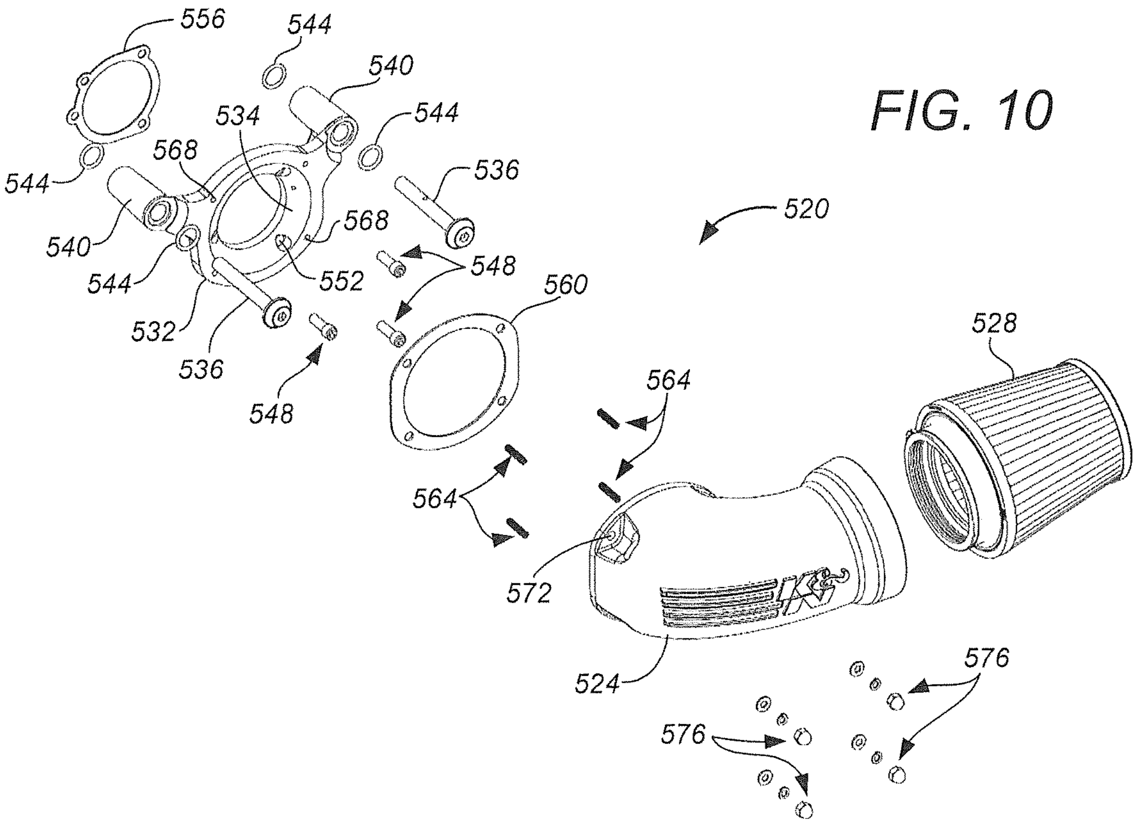
FIG. 10 illustrates an exploded perspective view of an exemplary embodiment of an aircharger air intake system comprising an air filter coupled with an intake tube and is suitable for motorcycle engines.

FIG. 10 illustrates an exploded view of an exemplary embodiment of an aircharger air intake system 520 that is particularly suitable for use with motorcycle engines, as well as various other relatively small engines. The aircharger air intake system 520 is comprised of an intake tube 524 that couples an air filter 528 to an air intake of an engine. The air filter 528 may be coupled directly with the intake tube 524 by way of a suitable fastener, such as a hose clamp or other similar fastener. The intake tube 524 may be coupled with the air intake of the engine by way of a breather plate 532 that includes a velocity stack portion 534 that is configured to direct air from the intake tube 524 into the intake of the engine.

The breather plate 532 may be fastened to the engine by way of a pair of bolts 536 extending through mount portions 540 of the breather plate. O-Rings 544 may be disposed above and below the mount portions 540 to provide cushioning between the breather plate 532, the bolts 536, and the engine. It is contemplated that the intake tube 524 and the breather plate 532 may be comprised of any rigid material capable of withstanding the temperature and air pressure associated with operation of the engine without becoming deformed or otherwise damaged. In the illustrated embodiment of FIG. 10, for example, the intake tube 524 and the breather plate 532 are comprised of suitable aluminum alloys, and the bolts 536 are comprised of alloy chrome steel.

As shown in FIG. 10, the breather plate 532 may be coupled to the air intake of the engine by way of a plurality of suitable fasteners 548. In one embodiment, the fasteners 548 are socket head cap screws comprised of stainless steel. Each of the fasteners 548 may be extended through a countersunk hole 552 disposed in the breather plate 532 and into a threaded hole in the air intake of the engine. A gasket 556 may be configured to establish an airtight seal between the breather plate 532 and the air intake of the engine. As will be appreciated, the shape and size of the gasket 556 and the breather plate 532 generally are formed to mate with the shape and size of the air intake of the engine. In some embodiments, the gasket 556 may be comprised of nylon reinforced neoprene or other suitable material.

In the illustrated embodiment of FIG. 10, a gasket 560 may be disposed between the intake tube 524 and the breather plate 532 so as to establish an airtight seal therebetween. Similar to the gasket 556, the gasket 560 may be formed of nylon reinforced neoprene or any other suitable material. A plurality of threaded studs 564 may be inserted through the gasket 560 and engaged within threaded holes 568 in the breather plate 532, such that a remaining portion of each threaded stud 564 extends from the breather plate. The remaining portions of the threaded studs 564 may be extended through holes 572 disposed in the intake tube 524. A plurality of acorn nuts 576 may be engaged with the threaded studs 564 and tightened so as to fasten the intake tube 524 to the breather plate 532 and form an airtight seal therewith.

Figure 11:
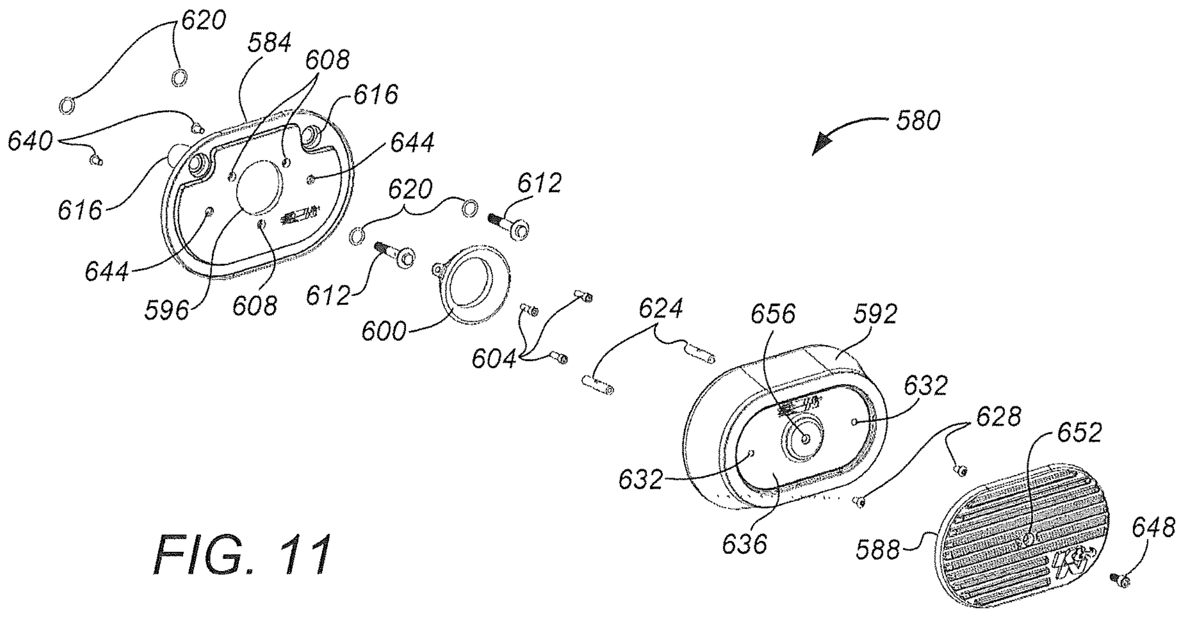
FIG. 11 illustrates an exploded perspective view of an exemplary embodiment of an aircharger air intake system comprising an air filter retained between a filter back plate and a filter lid and is suitable for relatively small engines.

FIG. 11 illustrates an exploded view of an exemplary embodiment of an aircharger air intake system 580 that is suitable for relatively small engines, such as motorcycle engines, as well as engines utilized with all-terrain vehicles, quads, quad bikes, three-wheelers, four-wheelers, quad cycles, and the like. The aircharger air intake system 580 is comprised of a filter back plate 584 and a filter lid 588 that couple an air filter 592 with an air intake of an engine. The filter back plate 584 and the filter lid 588 generally are comprised of a rigid material capable of withstanding the temperature and air pressure associated with operation of the engine without becoming damaged or deformed. In some embodiments, for example, the filter back plate 584 and the filter lid 588 may be comprised of suitable aluminum alloys.

The filter back plate 584 an air opening 596 that may be coupled with the air intake of the engine. The air opening 596 is configured to receive a velocity stack 600 that serves to establish an airtight seal between the filter back plate and the air intake of the engine, as well as to direct air from the air filter 592 into the air intake. Fasteners 604 may be inserted through the velocity stack 600, through intake mount holes 608 disposed in the filter back plate 584 and engaged with threaded holes of the air intake of the engine. Tightening the fasteners 604 fixates the filter back plate 584 to the intake of engine and causes the velocity stack 600 to establish an airtight seal between the filter back plate 584 and the air intake of engine. Further, the filter back plate 584 may be coupled with the engine by way of a pair of bolts 612 extending through mount portions 616 of the filter back and engages with threaded holes disposed in the engine. O-Rings 620 may be disposed above and below the mount portions 616 to provide cushioning between the filter back plate 584, the bolts 616, and the engine, as well as to prevent unfiltered air from bypassing the air filter 592.

It is contemplated that a variety of techniques may be employed to couple the air filter 592 with the filter back plate 584, without limitation. In the embodiment illustrated in FIG. 11, threaded standoffs 624 are disposed between an interior of the air filter 592 and the filter back plate 584. Fasteners 628 are inserted through holes 632 disposed in a cap 636 of the air filter 592 and fixedly engaged with the threaded standoffs 624. Similarly, fasteners 640 are inserted through holes 644 disposed in the filter back plate 584 and fixedly engaged with the threaded standoffs 624. Once fixedly engaged, the fasteners 628, 640 and the threaded standoffs 624 press the air filter 592 against the filter back plate 584, such that all air entering the velocity stack 600 first passes through the air filter.

As shown in FIG. 11, the filter lid 588 is configured to be coupled with the cap 636 of the air filter 592. In the illustrated embodiment, a fastener 648 may be inserted through a hole 652 in the filter lid 588 and fixedly engaged with a threaded hole 656 disposed in the cap 636. As will be appreciated, the filter lid 588 generally provides structural protection to the cap 636 of the air filter 592, as well as providing aesthetic properties to the aircharger air intake system 580.

Figure 12:
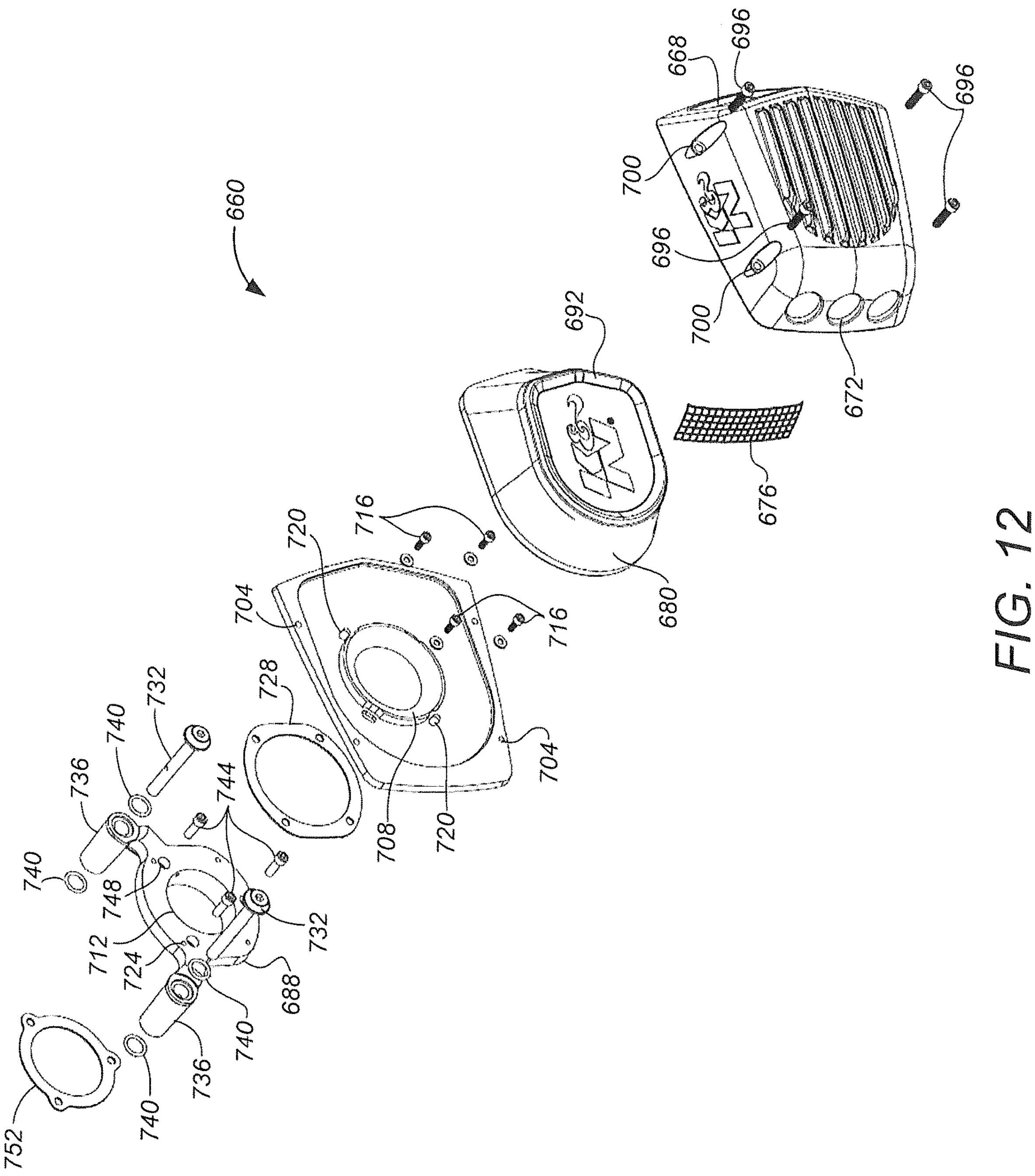
FIG. 12 illustrates an exploded perspective view of an exemplary embodiment of an aircharger air intake system comprising an air scoop and is suitable for relatively small engines, such as motorcycle engines and engines utilized recreational vehicles.

FIG. 12 illustrates an exploded view of an exemplary embodiment of an aircharger air intake system 660 comprising an air scoop 664 that is well suited for use with relatively small engines, such as motorcycle engines, as well as engines utilized with all-terrain vehicles, quads, quad bikes, three-wheelers, four-wheelers, quad cycles, and the like. The air scoop 664 includes a forward opening 668 and one or more rearward openings 672. The forward opening 668 is configured to capture an oncoming airstream due to vehicle motion. The rearward openings 672 are configured to allow air to enter the air scoop 664 in absence of the oncoming airstream. A mesh insert 676 may be fastened inside the air scoop 664 and covering the rearward openings 672 so as to increase the aesthetic appeal of the air scoop 664.

An air filter 680 may be retained between the air scoop 664 and an air scoop base 684 that may be coupled with the air intake of the engine by way of a breather plate 688. The air filter 680 comprises a pliable strip 692 that is configured to be pressed against an interior surface of the air scoop 664, such that upon fastening the air scoop 664 onto the air scoop base 684, the pliable strip 692 presses the air filter 680 against air scoop base 684. In the illustrated embodiment of FIG. 12, the air scoop 664 may be fastened to the air scoop base 684 by inserting a plurality of fasteners 696 through holes 700 in the air scoop 664 and fixedly engaging the fasteners 684 with threaded holes 704 in the air scoop base 684. Once the air scoop 664 is tightened onto the air scoop base 684, air entering the air scoop 664 passes through the air filter 680 before entering into the air intake of the engine. It is contemplated that various techniques other than the fasteners 684 and the holes 700 may be utilized for fastening the air scoop 664 to the air scoop base 684, without limitation.

In the embodiment of FIG. 12, the air scoop base 684 comprises a velocity stack portion 708 that is configured to direct air from an interior of the air filter 680 through an air opening 712 of the breather plate 688 and into the air intake of the engine. A plurality of fasteners 716 may be inserted through holes 720 in the air scoop base 684 and fixedly engaged within threaded holes 724 disposed in the breather plate 688 so as to fasten the air scoop base to the breather plate. A gasket 728 may be disposed between the air scoop base 684 and the breather plate 688 so as to establish an airtight seal therebetween. In some embodiments, the gasket 728 may be comprised of nylon reinforced neoprene or any other suitable material.

The breather plate 688 illustrated in FIG. 12 is substantially similar to the breather plate 532 of FIG. 10, with the exception that the breather plate 688 lacks the velocity stack portion 534. The breather plate 688 may be fastened to the engine by way of a pair of bolts 732 extending through mount portions 736 of the breather plate. O-Rings 740 may be disposed above and below the mount portions 736 to provide cushioning between the breather plate 688, the bolts 732, and the engine. In some embodiments, the breather plate 688 may be comprised of any rigid material capable of withstanding the temperature and air pressure associated with operation of the engine without becoming deformed or otherwise damaged. In the illustrated embodiment of FIG.

12, for example, the breather plate 688 is comprised of a suitable aluminum alloy, and the bolts 732 are comprised of alloy chrome steel.

The breather plate 688 may be coupled to the air intake of the engine by way of a plurality of suitable fasteners 744. In one embodiment, the fasteners 744 are socket head cap screws comprised of stainless steel. Each of the fasteners 744 may be extended through a countersunk hole 748 disposed in the breather plate 688 and into a threaded hole in the air intake of the engine. A gasket 752 may be configured to establish an airtight seal between the breather plate 688 and the air intake of the engine. As will be appreciated, the shape and size of the gasket 752 and the breather plate 688 generally are formed to mate with the shape and size of the air intake of the engine. Similar to the gasket 728, in some embodiments the gasket 752 may be comprised of nylon reinforced neoprene or other suitable material.

It is contemplated that a user of any of the above-discussed aircharger systems may periodically clean the filter medium of the air filter rather than replacing the air filter, as is typically done with conventional air filtrations systems. It is envisioned that the air filter may be removed from any of the air boxes discussed herein and then a water hose used to flush contaminants from the filter medium, thereby leaving the air filter clean and ready for reuse. In some embodiments, wherein the filter medium comprises a filter oil composition, a solvent may be used to remove the oil from the filter medium. Once the filter medium is completely dry, a suitably formulated filter oil composition may be uniformly applied and allowed to wick into the filter medium. Various other cleaning methods will be apparent to those skilled in the art without deviating from the spirit and scope of the present disclosure.

While the invention has been described in terms of particular variations and illustrative figures, those of ordinary skill in the art will recognize that the invention is not limited to the variations or figures described. In addition, where methods and steps described above indicate certain events occurring in certain order, those of ordinary skill in the art will recognize that the ordering of certain steps may be modified and that such modifications are in accordance with the variations of the invention. Additionally, certain of the steps may be performed concurrently in a parallel process when possible, as well as performed sequentially as described above. To the extent there are variations of the invention, which are within the spirit of the disclosure or equivalent to the inventions found in the claims, it is the intent that this patent will cover those variations as well. Therefore, the present disclosure is to be understood as not limited by the specific embodiments described herein, but only by scope of the appended claims.

What is claimed is:

1. A method for an aircharger air intake system for an engine, comprising:
- configuring an air filter to entrap particulates flowing within an airstream into an air intake;
- configuring an air intake tube to conduct the airstream to the air intake;
- coupling the air filter to the intake tube;
- configuring a breather plate to join the intake tube and the air intake
- wherein configuring the breather plate including configuring a velocity stack portion to direct the airstream from the intake tube into the air intake.

2. The method of claim 1, wherein configuring the breather plate includes configuring a velocity stack portion to direct the airstream from the intake tube into the air intake.

3. The method of claim 1, wherein configuring the breather plate includes configuring one or more mount portions to receive bolts to enable fastening the breather plate to the engine.

4. The method of claim 3, wherein configuring the one or more mount portions includes disposing O-Rings above and below the one or more mount portions.

5. The method of claim 1, wherein configuring the breather plate includes configuring countersunk holes in the breather plate to receive fasteners for engaging with threaded holes in the air intake.

6. The method of claim 1, wherein configuring the breather plate includes configuring a gasket to establish an airtight seal between the breather plate and the air intake.

7. The method of claim 1, wherein configuring the breather plate includes engaging threaded studs within threaded holes in the breather plate such that the threaded studs extend through holes in the intake tube and receive fasteners that couple the intake tube to the breather plate.

8. A method for an aircharger air intake system for an engine, comprising:
- configuring an air filter to entrap particulates flowing within an airstream into an air intake;
- configuring an air scoop to be coupled with an air scoop base;
- forming the air filter to be retained between the air scoop and the air scoop base;
- configuring a velocity stack portion to direct the airstream from the air filter to air intake; and
- configuring a breather plate to couple the air scoop and the air intake.

9. The method of claim 8, wherein forming the air filter includes configuring a pliable strip comprising the air filter to be contacted by the air scoop such that the air filter is pressed onto the air scoop base.

10. The method of claim 8, wherein configuring the air scoop includes forming holes in the air scoop to receive fasteners extending into threaded holes in the air scoop base.

11. The method of claim 8, wherein configuring the air scoop includes forming a forward opening to allow the airstream to enter the air scoop.

12. The method of claim 11, wherein configuring the air scoop includes forming one or more rearward openings to allow a portion of the airstream to exit the air scoop.

13. The method of claim 12, wherein forming the one or more rearward openings includes fastening a mesh insert inside the air scoop covering the one or more rearward openings.

14. A method for an aircharger air intake system for an engine, comprising:
- configuring an air filter to entrap particulates flowing within an airstream into an air intake;
- configuring a filter back plate to couple the air filter and the air intake;
- configuring a velocity stack to be disposed on the filter back plate; and
- configuring a filter lid to be fastened onto a cap of the air filter.

15. The method of claim 14, wherein configuring the filter back plate includes forming an opening that receives the velocity stack.

16. The method of claim 14, wherein configuring the filter back plate includes forming intake mount holes that are aligned with threaded holes near the air intake.

17. The method of claim 16, wherein configuring the velocity stack includes forming holes that align fasteners with the intake mount holes and the threaded holes.

18. The method of claim 14, wherein configuring the filter back plate includes configuring one or more mount portions to receive bolts that enable fastening the filter back plate to the engine.

19. The method of claim 18, wherein configuring the one or more mount portions includes disposing O-Rings above and below the one or more mount portions.

20. The method of claim 14, wherein configuring the filter back plate includes engaging threaded studs within threaded holes in the breather plate such that the threaded studs extend through holes in a cap of the air filter and receive fasteners that press the air filter against the filter back plate.

* * * * *